(12) United States Patent
Yoo et al.

(10) Patent No.: US 9,377,305 B2
(45) Date of Patent: Jun. 28, 2016

(54) APPARATUS, SERVER AND METHOD FOR PROVIDING ROUTE GUIDANCE

(71) Applicant: HYUNDAI MNSOFT, Inc., Seoul (KR)

(72) Inventors: Young Soo Yoo, Seoul (KR); Sang Won Yang, Seoul (KR)

(73) Assignee: HYUNDAI MNSOFT, INC., Seoul (KR)

(*) Notice: Subject to any disclaimer, the term of this patent is extended or adjusted under 35 U.S.C. 154(b) by 0 days.

(21) Appl. No.: 14/067,055

(22) Filed: Oct. 30, 2013

(65) Prior Publication Data

US 2014/0358421 A1 Dec. 4, 2014

(30) Foreign Application Priority Data

May 31, 2013 (KR) .................. 10-2013-0062283

(51) Int. Cl.
*G01C 21/00* (2006.01)
*A61B 5/00* (2006.01)

(52) U.S. Cl.
CPC .............. *G01C 21/00* (2013.01); *G01C 21/005* (2013.01)

(58) Field of Classification Search
USPC ......................................... 701/410; 600/300
See application file for complete search history.

(56) References Cited

U.S. PATENT DOCUMENTS

| 7,953,549 | B2 * | 5/2011 | Graham | G06Q 30/02 434/258 |
| 8,260,667 | B2 * | 9/2012 | Graham | G06Q 30/02 342/357.31 |
| 2006/0142648 | A1 * | 6/2006 | Banet | A61B 5/0002 600/300 |
| 2008/0058615 | A1 * | 3/2008 | Clapp | G06Q 10/06 600/301 |
| 2008/0085696 | A1 * | 4/2008 | Salahshour | G08B 25/08 455/404.1 |
| 2008/0288166 | A1 * | 11/2008 | Onishi | G01C 21/20 701/533 |
| 2011/0054779 | A1 * | 3/2011 | Kim | G01C 21/3484 701/533 |
| 2012/0185164 | A1 * | 7/2012 | McCoy | G01C 21/3469 701/423 |
| 2013/0132434 | A1 * | 5/2013 | Scofield | G08G 1/0112 707/771 |
| 2014/0088869 | A1 * | 3/2014 | Graham | G06Q 30/02 701/532 |
| 2014/0122102 | A1 * | 5/2014 | Utter, II | G06F 19/3431 705/2 |

FOREIGN PATENT DOCUMENTS

| EP | 2570771 A1 | 3/2013 |
| JP | 2003-344068 A | 12/2003 |
| JP | 2009-288807 A | 12/2009 |
| JP | 2010-190648 A | 9/2010 |
| KR | 10-2003-0033853 A | 5/2003 |
| KR | 10-2012-0031972 | 4/2012 |
| WO | 2010/025467 A1 | 3/2010 |

* cited by examiner

*Primary Examiner* — Thomas G Black
*Assistant Examiner* — Tyler Paige
(74) *Attorney, Agent, or Firm* — Bacon & Thomas, PLLC

(57) ABSTRACT

A method for providing route guidance includes the route guiding apparatus transmitting to the server a user's location sensing signal; the server receiving the user's location sensing signal from the route guiding apparatus; the route guiding apparatus transmitting to the server a user's operation recognition signal; the server receiving the user's operation recognition signal from the route guiding apparatus; the controller determining a user's status based on at least one of the location sensing signal and the operation recognition signal; the server transmitting map data corresponding to a user's location determined using the user's status to the route guiding apparatus; the route guiding apparatus receiving the map data from the server; and the route guiding apparatus guiding a route to a destination based on the map data.

16 Claims, 2 Drawing Sheets

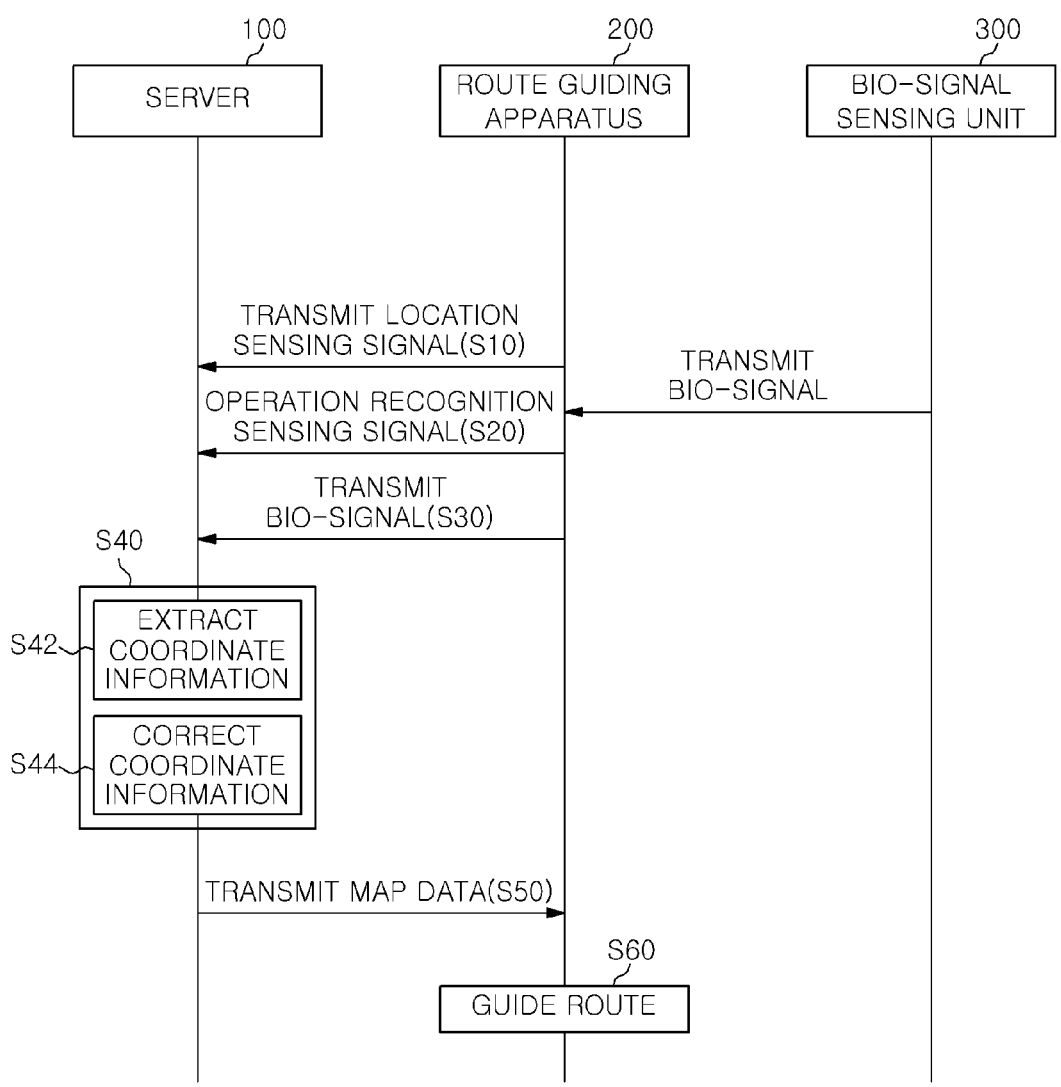

APPARATUS, SERVER AND METHOD FOR PROVIDING ROUTE GUIDANCE

CROSS-REFERENCE TO RELATED APPLICATION(S)

The present invention claims priority of Korean Patent Application No. 10-2013-0062283, filed on May 31, 2013, which is incorporated herein by reference.

FIELD OF THE INVENTION

The present invention relates to a route guiding apparatus, a route guiding server and a route guiding method. More particularly, the present invention relates to an apparatus, a server and a method for providing route guidance, capable of actively providing a user with necessary map data by analyzing a user's behavior and determining location and state of a user.

BACKGROUND OF THE INVENTION

Generally, a navigation system mounted on, e.g., a vehicle or a smart phone, captures its current location based on location information of the vehicle received through a GPS (Global Positioning System) satellites, reads data of a current location from a road database which is built therein or received from the outside, and displays the road together with the location of the vehicle, thereby helping the user to identify the location of a currently driving road or to find a destination with ease when driving on the first trip.

In order to satisfy user needs, in recent years, a user is provided with more precise route information through advanced technologies, which are integrated into a navigation system, such as informing expected arrival time from a starting point to a destination and suggesting a detour depending on a road situation to the destination, when a user sets the destination.

As such, in a technology to guide a route to a destination, the technology is becoming highly developed to satisfy user needs.

Related art of the above technology is disclosed in Korean Laid-Open patent No. 10-2012-0031972 "Navigation Terminal and Route Information Guiding Method Using the Same," published on Apr. 4, 2012.

Recently, there is a new technical trend in which a navigation system includes a separate database for maps such as a cycle route and a mountain trail as well as guiding a route up to a destination by a vehicle, so that it presents a function to selectively display individual maps that meet user needs.

Typically, however, there has been an inconvenience that a user has to directly select his or her desired map when using the function as mentioned above.

In order to remedy the inconvenience, a technology has been developed in which user's location information is received through a GPS satellite, and a map corresponding to the location is automatically selected and displayed. Nonetheless, fundamentally, location information obtained through the GPS satellite has error of several meters to tens of meters so that there occurs a problem in that a location different from an actual user's location is displayed on a map.

SUMMARY OF THE INVENTION

In view of the above, the present invention provides a method for providing navigation and its related content, capable of analyzing a user's action, determining location and state of the user, and actively providing the user with map data needed to the user.

In accordance with a first aspect of the present invention, there is provided a method for providing route guidance that is executed by a route guiding apparatus including a location sensing unit and an operation recognition unit, and a server including a controller. The method includes: the route guiding apparatus transmitting to the server a user's location sensing signal sensed by the location sensing unit; the server receiving the user's location sensing signal from the route guiding apparatus; the route guiding apparatus transmitting to the server a user's operation recognition signal recognized by the operation recognition unit; the server receiving the user's operation recognition signal from the route guiding apparatus; the controller determining a user's status based on at least one of the location sensing signal and the operation recognition signal; the server transmitting map data corresponding to a user's location determined using the user's status determined based on at least one of the location sensing signal and the operation recognition signal to the route guiding apparatus; the route guiding apparatus receiving the map data from the server; and the route guiding apparatus guiding a route to a destination based on the map data.

Further, the transmitting to the server a user's operation recognition signal may comprise sensing at what acceleration the user moves; and sensing in what level a vibration occurs to the user.

Further, the transmitting to the server a user's location sensing signal may comprise receiving coordinate information from a GPS (Global Positioning System) satellite; and receiving information of a wireless AP (Access Point) to detect the user's location.

Further, the method may further comprise transmitting to the server a user's bio-signal received from a bio-signal sensing unit.

Further, the bio-signal sensing unit may comprise a heart rate sensor, a temperature sensor and a microphone.

Further, the bio-signal sensing unit may be integrally formed with the route guiding apparatus or may be incorporated in separate devices.

Further, the method may further comprise receiving the user's bio-signal from the route guiding apparatus before determining the user' status, and the user's status is determined based on the bio-signal.

Further, the determining the user's status may comprise extracting coordinate information of the user's location from the received location sensing signal; and determining the user's status by correcting the coordinate information based on at least one of the received operation recognition signal and the bio-signal.

In accordance with a second aspect of the present invention, there is provided an apparatus for providing route guidance. The apparatus includes a location sensing unit configured to sense a user's location; an operation recognition unit configured to recognize a user's operation; a communication unit configured to transmit to a server a user's location sensing signal and a user's operation recognition signal and to receive from the server map data corresponding to the user's location; and a display unit configured to guide a route up to a destination based on the map data.

Further, the communication unit may be further configured to receive the bio-signal from a bio-signal sensing unit that senses a user's bio-signal, and transmit the bio-signal to the server.

Further, the bio-signal sensing unit may comprise a heart rate sensor configured to sense a heart rate of the user; a temperature sensor configured to sense a body temperature of the user; and a microphone configured to sense a breath of the user.

Further, the bio-signal sensing unit may be integrally formed with the route guiding apparatus or may be incorporated in separate devices.

Further, the operation recognition unit may comprise a acceleration sensor configured to sense at what acceleration the user moves; and a gyroscope sensor configured to sense in what level a vibration occurs to the user.

Further, the location sensing unit may comprise a GPS (Global Positioning System) configured to receive coordinate information from one or more of GPS satellites, and to receive information of a wireless AP (Access Point) to detect the user's location.

In accordance with a third aspect of the present invention, there is provided a server for providing route guidance. The server includes an additional communication unit configured to receive a user's location sensing signal and a user's operation recognition signal from a route guiding apparatus including a location sensing unit and an operation recognition unit; a memory unit that stores map data, the map data including one or more of a trail map, a cycle route map, a motor road map, a sidewalk route map and an indoor map; and a controller configured to determine a user's status based on at least one of the location sensing signal and operation recognition signal, to detect the map data corresponding to a user's location determined using the user's status from the memory unit, and to transmit the map data to the route guiding apparatus through the additional communication unit.

Further, the location sensing unit may comprise a GPS (Global Positioning System) configured to receive coordinate information from one or more of GPS satellites, and to receive information of a wireless AP (Access Point) to detect the user's location.

Further, the additional communication unit may be further configured to receive a user's bio-signal from the route guiding apparatus, and the controller may determine the user's status based on the bio-signal.

Further, the controller may be further configured to determine the user's status by extracting coordinate information of the user's location from the location sensing signal, and correcting the coordinate information based on at least one of the operation recognition signal and the bio-signal.

The route guiding apparatus and the route guiding server in accordance with the present invention sense a user's location and bioactivity, actively extract a user's correct location and provide a user with necessary map data, thereby increasing a user's convenience and enhancing a feeling of satisfaction.

BRIEF DESCRIPTION OF THE DRAWINGS

The above and other objects and features of the present invention will become apparent from the following description of the embodiments given in conjunction with the accompanying drawings, in which:

FIG. 2 is a flow chart illustrating a route guiding method in accordance with an embodiment of the present invention.

DETAILED DESCRIPTION OF THE EMBODIMENTS

Figure 1:
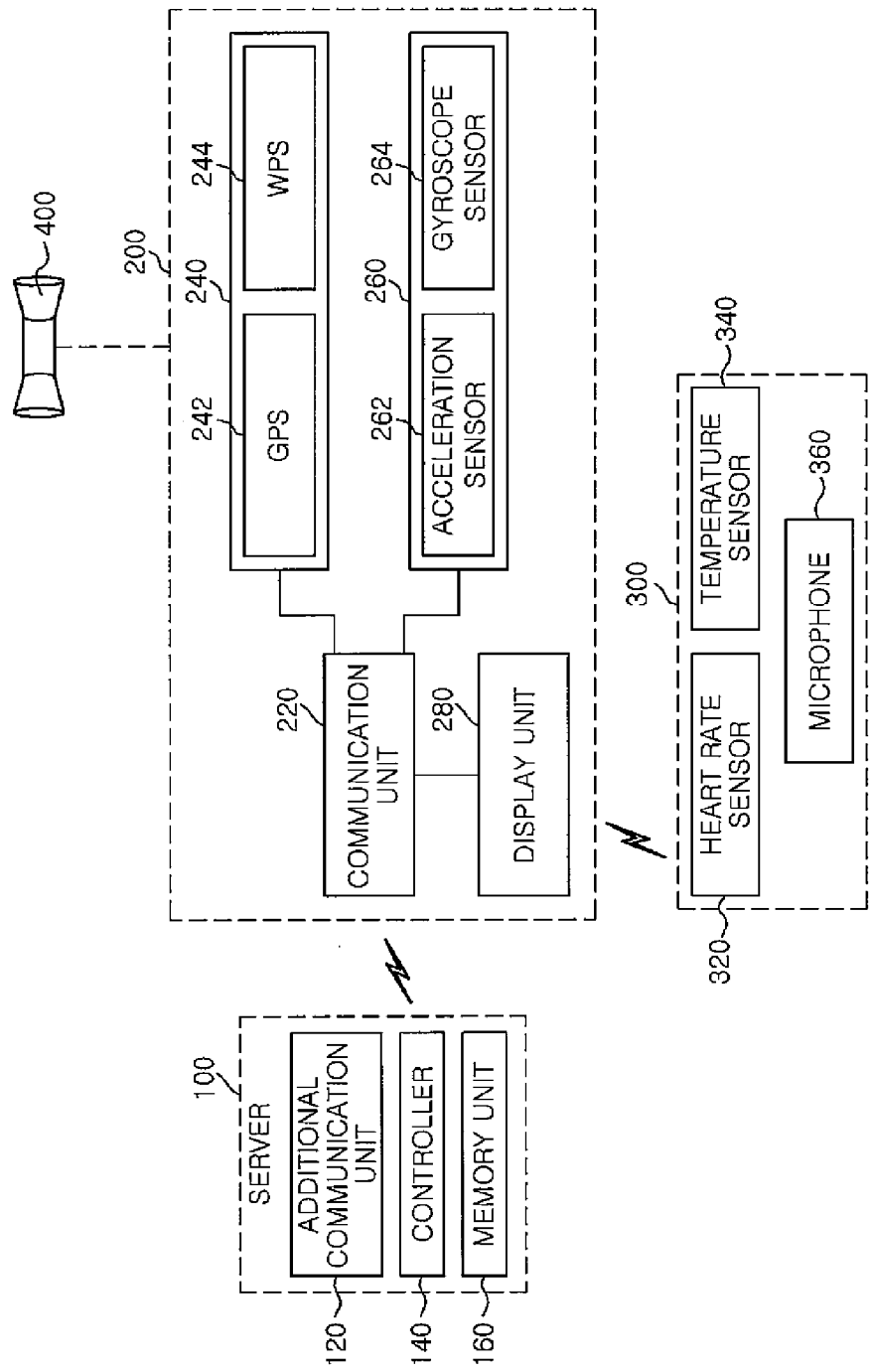
FIG. 1 is a functional block diagram of a route guiding apparatus and a route guiding server in accordance with an embodiment of the present invention.

Hereinafter, a route guiding apparatus, a route guiding server and a route guiding method in accordance with an embodiment of the present invention will be described in detail with reference to the accompanying drawings. In the drawings, thickness of lines and size of components shown in the drawings may be exaggerated for the purpose of descriptive clarity and for the sake of convenience. Further, the following terms are defined in consideration of the functions of the present invention, which may vary depending on intensions of a user or an operator or practices. Therefore, the definition of such terms should be made on the basis of the disclosure throughout the present specification.

FIG. 1 is a functional block diagram of a route guiding apparatus and a route guiding server in accordance with an embodiment of the present invention.

Referring to FIG. 1, a route guiding apparatus 200 in accordance with an embodiment of the present invention includes a communication unit 220, a location sensing unit 240, an operation recognition unit 260 and a display unit 280.

The communication unit 220 transmits to the server 100 a user's location sensing signal sensed by the location sensing unit 240 and a user's operation recognition signal recognized by the operation recognition unit 260. Then, the server 100 determines a user's status based on the user's location sensing signal and user's operation recognition signal and the route guiding apparatus 200 receives map data corresponding to the user's location determined using the user's status from the server 100.

Here, the user's status includes, e.g., whether the user's location is indoor or outdoor, e.g., a cycle road, a trail, a sidewalk route, a motor road or the like, at what acceleration the user moves, in what level a vibration occurs to the user and the like.

It will be appreciated by those skilled in the art that the route guiding apparatus 200 in accordance with the embodiment of the present invention does not mean an On-board type apparatus to guide a route based on map data stored in advance, but an apparatus such as OBN (Off-Board Navigation) which downloads map data from the server 100 and guides route in real time.

Further, the communication unit 220 in accordance with the embodiment receives a user's bio-signal from a bio-signal sensing unit 300 and transmits the bio-signal received to the server 100, so that it enables the apparatus to determine a user's correct location or the user's status using the bio-signal.

The bio-signal sensing unit 300 is responsible for sensing a bioactivity, and especially the bio-signal sensing unit 300 in accordance with the present invention senses a user's bioactivity using bio-signals collected from devices including a heart rate sensor 320, a temperature sensor 340 and a microphone 360.

The bio-signal sensing unit 300 may be incorporated in devices such as user's glasses or watch wearable separately from the route guiding apparatus 200 in accordance with the present embodiment in order to make a correct bioactivity sensing of a user, but not limited thereto. Alternatively, the separate devices may be integrally formed with the route guiding apparatus 200.

On the other hand, a procedure to determine a user's location using the determined user's status in the server 100 will be described below.

The location sensing unit 240 serves to receive coordinate information and detect a location of a user. Especially, the location sensing unit 240 detects a location of a user who holds the route guiding apparatus 200 including the GPS (Global Positioning System) 242 and WPS (WiFi-based Positioning System) 244.

To put it more specific, the GPS 242 receives coordinate information from one or more of GPS satellites 400, and the WPS 244 receives information of a wireless AP (Access Point) inputted thereto to detect the user's location.

Accordingly, the server 100 to be described may determine a location of an outdoor user based on information received from the GPS 242, and a location of an indoor user based on information received from the WPS 244.

The operation recognition unit 260 is used to recognize a user's operation. Especially, the operation recognition unit 260 includes an acceleration sensor 262 to sense a user's acceleration or a gyroscope sensor 264 to sense a user's rotational inertia and recognizes an operation of a user who holds the route guiding apparatus 200.

The display unit 280 guides a route up to a destination to a user based on map data received through the communication unit 220.

Since the route up to the destination is not necessarily guided through the display unit 280, it may be possible to design the route guiding apparatus so that the route can be displayed on glasses or watch to which the bio-signal sensing unit 300 described above.

To do it, simplified route guiding information may be transmitted to the glasses or watch in a TBT (Turn By Turn) format through the communication unit 220 based on the map data received from the server 100, thereby guiding a route to a user through a variety of display devices.

The server 100 in accordance with the embodiment includes an additional communication unit 120, a controller 140 and a memory unit 160.

The additional communication unit 120 receives from the route guiding apparatus 200 a user's location sensing signal and an operation recognition signal and forwards map data of the memory unit 160 to the route guiding apparatus 200.

The controller 140 determines a user's status based on the location sensing signal and operation recognition signal received through the additional communication unit 120 and detects map data corresponding to the user's location, which is determined, from the memory unit 160.

In accordance with the present exemplary embodiment, it is noted that the controller 140 determines the user's location more correctly by correcting coordinate information using operation characteristics of the user recognized through the operation recognition unit 260 as well as using coordinate information received.

In other words, since the location information received from one or more of the GPS satellite 400 may include error more or less, the controller 140 determines a user's correct location by correcting the error with reference to the operational characteristics of a user.

As described above, since the operation recognition unit 260 of the route guiding apparatus 200 comprises the acceleration sensor 262 and gyroscope sensor 264, it is possible to sense at what acceleration a user is moving and in what level a vibration occurs to a user, using the sensors.

An example to determine a user's location using sensing values of the operation recognition unit 260 is shown in TABLE 1.

TABLE 1

|  | Acceleration | Vibration |
| --- | --- | --- |
| Sidewalk route | Less than first acceleration | Exceeding first vibration value |
| Cycle road | Equal to or higher than first acceleration | Equal to or less than first vibration |

TABLE 1-continued

|  | Acceleration | Vibration |
| --- | --- | --- |
| Motor road | Equal to or higher than second acceleration | Equal to or less than second vibration value |

In TABLE 1, the first acceleration means the maximum value of acceleration when a normal person moves on a sidewalk route, which has a value smaller than the second acceleration, and the second acceleration means the maximum value of acceleration when a person moves by bicycle. The first vibration value means the minimum value of vibration when a normal person moves on a sidewalk route, which has a value higher than the second vibration value, and the second vibration value means the minimum value of vibration when a person moves by bicycle.

When a person moves in the fastest relatively, at the second acceleration or higher and vibration is least relatively, the vibration value being equal to or less than the second vibration value as illustrated in TABLE 1, it means that a user moves fast so that it is determined that a user is moving on a motor road by vehicle.

Further, when the acceleration is intermittently fast, which is equal to or more than the first acceleration and the vibration is equal to or less than the first vibration value, it means that a user is moving at a moderate speed in a vibrating state, so that it may be determined that a user is moving on a cycle road by bicycle.

Further, when the acceleration is the fastest relatively, which is less than the first acceleration, and the vibration is relatively high, which exceeds the first vibration value, it means that a user is slowly moving in a severe vibrating state, so that it may be determined that a user is moving on a sidewalk route on foot.

However, when the acceleration is less than the first acceleration and the vibration exceeds the first vibration value, a user may not walk on foot but on a trail. As described above, since the controller 140 receives coordinate information of a user through the location sensing unit 240, it is possible to determine a user's location correctly depending on whether the vicinity of user's coordinate information is a trail or a sidewalk route.

Further, the controller 140 determines whether a user's location is indoor or outdoor based on the intensity of a receiving signal of the GPS 242 or WPS 244 of the location sensing unit 240.

More specifically, when a user is indoor, the intensity of a receiving signal of the GPS 242 is weakly sensed in comparison to that of a receiving signal of the WPS 244, and when a user is outdoor, the intensity of a receiving signal of the GPS 242 is intensely sensed in comparison to that of a receiving signal of the WPS 244.

Therefore, the controller 140 senses whether a user is located indoor or outdoor based on the intensities of the receiving signals of the GPS 242 and WPS 244, which results in providing more detailed route guidance.

In other words, when it is sensed that a user is outdoor, the controller 140 determines a user's location in consideration of user's operation characteristics recognized through the operation recognition unit 260 as described above, and when it is sensed that a user is indoor, the controller 140 determines a user's location based on a signal received from the WPS 244.

In this connection, the memory unit 160 stores map data such as a trail map, a cycle road map, a motor road map, and a sidewalk route map, and the controller 140 deliveries to the route guiding apparatus 200 a map corresponding to the user's location through the additional communication unit 120.

For example, when it is determined that a user is on a trail, the controller 140 may choose a trail map from the memory unit 160 and transmit relevant map data to the route guiding apparatus 200. Further, when it is determined that a user is on a cycle road, the controller 140 may transmit cycle road map data to the route guiding apparatus 200.

In the same manner, for example, when it is determined that a user is indoor, the controller 140 may choose an indoor map of department store, store, shopping mall, or subway station corresponding to the user's location from among indoor maps of the memory unit 160 and transmit relevant indoor map data to the route guiding apparatus 200.

As such, since it is possible to determine a correct location of a user who is indoor or outdoor based on a receiving signal from the GPS 242 and WPS 244 in accordance with the embodiment, the route guiding apparatus 200 is able to detect correct map data depending on the change in a user's location and to make a route guidance even though a user requests a route guidance from indoor state to outdoor state or vice versa.

Further, the server 100 in accordance with the present exemplary embodiment may receive a user's bio-signal from the route guiding apparatus 200 and determine a user's location or the user's status based on at least one selected from the group consisting the bio-signal, the location sensing signal and operation recognition signal described above.

Meanwhile, the bio-signal sensing unit 300 includes one or more a heart rate sensor 320, a temperature sensor 340 and a microphone, and the controller 140 determines the user's correct location in consideration of their sensing values.

TABLE 2 below is an example that a user's location is determined based on a bio-signal sensing value of the bio-signal sensing unit 300.

TABLE 2

| | Heart rate | Temperature | Breath |
|---|---|---|---|
| Sleeping | Equal to or less than first heart rate | Equal to or less than first body temperature | Regular |
| Sidewalk | Equal to or less than second heart rate | Equal to or less than second body temperature | Regular |
| Running | Exceeding third heart rate | Exceeding third body temperature | Irregular |
| Cycling | Equal to or less than third heart rate | Equal to or less than third body temperature | Irregular |
| Automobile riding | Equal to or less than first heart rate | Equal to or less than first temperature | Regular |

In TABLE 2, the first heart rate means a heart rate when sleeping or no special operation, which has a value less than the second heart rate, the second heart rate means a heart rate when moving on a sidewalk, which has a value less than the third heart rate, and the third heart rate means the maximum heart rate when riding a bicycle.

Further, the first body temperature means a body temperature when sleeping or no special action, which has a value less than the second body temperature, the second body temperature means an increased body temperature when moving on a sidewalk, which has a value less than the third body temperature, and the third body temperature means the maximum body temperature when riding a bicycle.

As described in Table 2, when it is measured that heart rate is the lowest, which is equal to or less than the first heart rate, body temperature is less than the first body temperature, and breath is regular, it is expected that a user is sleeping indoor or in a vehicle.

Further, when it is measured that heart rate is equal to or less than the second heart rate, body temperature is equal to or less than the second body temperature and breath is regular, it is expected that a user is moving on a sidewalk on foot. In such a manner, it is possible to determine a user's correct location such as a cycle road and a motor road based on a bio-signal that changes depending on running, riding bicycle and riding motor.

Especially, when a user is sleeping and is riding a vehicle, user's bio-signals are similarly sensed. However, when referring to the example reviewed in Table 1, it is possible to discriminate whether a user is sleeping indoor or in a vehicle depending a user's location sensing signal although similar bio-signals are sensed.

FIG. 2 is a flow chart illustrating a route guiding method in accordance with an embodiment of the present invention.

A route guiding method in accordance with the embodiment with reference to FIG. 2 is as follows. First, when receiving a route guiding request from a user, the route guiding apparatus 200 transmits to the server 100 a user's location sensing signal sensed by the location sensing unit 240 in operation S10, and transmits to the server 100 a user's operation recognition signal recognized by the operation recognition unit 260 in operation S20.

In accordance with the embodiment, additionally, the route guiding apparatus 200 may receive a user's bio-signal sensed by the bio-signal sensing unit 300, and also transmit the bio-signal to the server 100 in operation S30.

In this case, since each signal transmission is not limited to the order described above in the operations S10 to S30 to transmit the location sensing signal, operation recognition signal and bio-signal to the server 100, it may be possible to transmit each signal in different orders.

Subsequently, in operation S40, the server 100 determines a user's location or a user's status based on user's received location sensing signal, operation recognition signal and bio-signal.

To put it more specific, the server 100 extracts coordinate information of a user's location from the received location sensing signal in operation S42 and corrects the coordinate information based on at least one of the received operation recognition signal and bio-signal in operation S44, thereby determining a user's status.

As such, in accordance with the embodiment, it is possible to determine a user's status more correctly by correcting coordinate information based on user's operation characteristics or bio-signals as well as determining the user's location using coordinate information received from the route guiding apparatus 200.

That is, since the location information received from one or more of GPS satellites 400 include some errors, the server 100 determines a user's correct location with reference to a user's operation characteristic or bio-signals.

Thereafter, the server 100 transmits to the route guiding apparatus 200 map data corresponding to a user's determined location in operation S50, and the route guiding apparatus 200 guides a route to a destination based on the relevant map data in operation S60.

In accordance with the embodiment as set forth above, user's location and bio-activity are sensed, a user's correct location is extracted, and necessary map data corresponding to the extracted user's correct location is actively provided to the user, thereby increasing a user's convenience and enhancing a feeling of satisfaction While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for providing route guidance that is executed by a route guiding apparatus, a bio-signal sensing unit and a server including a controller, the route guiding apparatus including a location sensing unit and an operation recognition unit, the method comprising:
   the route guiding apparatus transmitting to the server a user's location sensing signal representing a location of the user and sensed by the location sensing unit;
   the server receiving the user's location sensing signal from the route guiding apparatus;
   the route guiding apparatus transmitting to the server a user's operation recognition signal representing an operation of the user, recognized by the operation recognition unit;
   the server receiving the user's operation recognition signal from the route guiding apparatus;
   the route guiding apparatus transmitting to the server a user's bio-signal representing a user's bioactivity sensed by the bio-signal sensing unit;
   the server receiving the user's bio-signal from the route guiding apparatus;
   the controller recognizing a kind of road where the users is currently moving, based on the location sensing signal, the movement recognition signal and the bio-signal;
   the controller determining map data based on the recognized kind of the road, the map data corresponding to the location of the user;
   the server transmitting the determined map data to the route guiding apparatus;
   the route guiding apparatus receiving the map data from the server; and
   the route guiding apparatus guiding a route to a destination based on the map data,
   wherein said transmitting to the server the user's operation recognition signal comprises a vibration level and a rotational inertia for the user.

2. The method of claim 1, wherein said transmitting to the server a user's operation recognition signal comprises:
   sensing at what acceleration the user moves.

3. The method of claim 1, wherein said transmitting to the server a user's location sensing signal comprises:
   receiving coordinate information from a GPS(Global Positioning System) satellite; and
   receiving information of a wireless AP (Access Point) to detect the user's location.

4. The method of claim 1, wherein the bio-signal sensing unit comprises a heart rate sensor, a temperature sensor and a microphone.

5. The method of claim 1, wherein the bio-signal sensing unit is integrally formed with the route guiding apparatus or is incorporated in separate devices.

6. The method of claim 1, wherein said determining the user's location comprises extracting coordinate information of the user's location from the received location sensing signal; and determining the user's location by correcting the coordinate information based on at least one of the received operation recognition signal and the bio-signal.

7. An apparatus for providing route guidance, the apparatus comprising:
   a location sensing unit configured to sense a user's location;
   an operation recognition unit configured to recognize a user's operation;
   a communication unit configured to transmit to a server a user's location sensing signal representing a location of the user and a user's operation recognition signal representing an operation of the user and to receive from the server map data corresponding to the user's location; and
   a display unit configured to guide a route up to a destination based on the map data;
   wherein the apparatus is configured to transmit to the server a user's bio-signal representing a user's bioactivity sensed by a bio-signal sensing unit;
   wherein the server is configured to receive the user's bio-signal from the apparatus;
   wherein the server includes a controller configured to recognize a kind of road where the user is currently moving, based on the location sensing signal, the movement recognition signal and the bio-signal;
   wherein the controller is configured to determine map data based on the recognized kind of the road, the map data corresponding to the location of the user; and
   wherein the operation recognition unit comprises a gyroscope sensor configured to sense a vibration level and a rotational inertia for the user.

8. The apparatus of claim 7, wherein the communication unit is further configured to receive the bio-signal from a bio-signal sensing unit that senses a user's bio-signal, and transmits the bio-signal to the server.

9. The apparatus of claim 8, wherein the bio-signal sensing unit comprises:
   a heart rate sensor configured to sense a heart rate of the user;
   a temperature sensor configured to sense a body temperature of the user; and
   a microphone configured to sense a breath of the user.

10. The apparatus of claim 8, wherein the bio-signal sensing unit is integrally formed with the route guiding apparatus or is incorporated in separate devices.

11. The apparatus of claim 7, wherein the operation recognition unit comprises:
   an acceleration sensor configured to sense at what acceleration the user moves.

12. The apparatus of claim 7, wherein the location sensing unit comprises:
   a GPS(Global Positioning System) configured to receive coordinate information from one or more of GPS satellites, and
   to receive information of a wireless AP (Access Point) to detect the user's location.

13. A server for providing route guidance, the server comprising:
   an additional communication unit configured to receive a user's location sensing signal representing a location of the user and a user's operation recognition signal representing an operation of the user from a route guiding apparatus including a location sensing unit and an operation recognition unit;

a memory unit that stores map data, the map data including one or more of a trail map, a cycle route map, a motor road map, a sidewalk route map and an indoor map; and a controller;

wherein the route guiding apparatus is configured to transmit to the server a user's bio-signal representing a user's bioactivity sensed by a bio-signal sensing unit;

wherein the server is configured to receive the user's bio-signal from the route guiding apparatus;

wherein the controller is configured to recognize a kind of road where the user is currently moving based on the location sensing signal, the movement recognition signal and the bio-signal, to detect the map data corresponding to a user's location determined using the user's status from the memory unit, and to transmit the map data to the route guiding apparatus through the additional communication unit;

wherein the controller is configured to determine map data based on the recognized kind of the road, the map data corresponding to the location of the user;

wherein the location sensing unit comprises WPS (WiFi-based Positioning System), and the WPS receives information of a wireless AP (Access Point) inputted thereto to detect the user's location; and the controller is configured to determine the user's status by correcting the coordinate information based on at least one of the operation recognition signal and the bio-signal.

14. The server of claim 13, wherein the location sensing unit comprises:
  a GPS(Global Positioning System) configured to receive coordinate information from one or more of GPS satellites, and
  to receive information of a wireless AP (Access Point) to detect the user's location.

15. The server of claim 14, wherein the additional communication unit is further configured to receive a user's bio-signal from the route guiding apparatus, and the controller determines the user's status based on the bio-signal.

16. The server of claim 15, wherein the controller is further configured to determine the user's status by extracting coordinate information of the user's location from the location sensing signal.

\* \* \* \* \*